Figure 1:
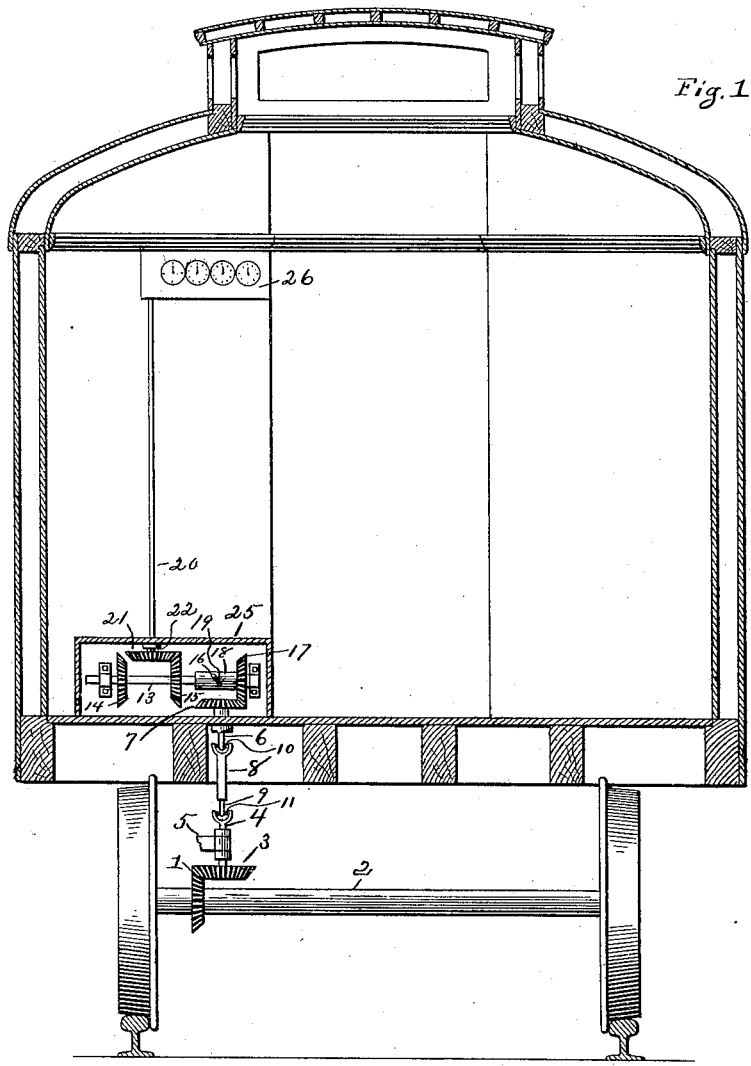

(No Model.)  2 Sheets—Sheet 1.

J. H. WHITING.
MECHANISM FOR INDICATING DISTANCE TRAVELED BY CARS OR VEHICLES.

No. 606,258.  Patented June 28, 1898.

WITNESSES  
Harry D. Pierce  
Willis L. Brown

INVENTOR  
John H. Whiting  
BY  
Glascock & Co  
ATTORNEYS.

(No Model.) 2 Sheets—Sheet 2.
J. H. WHITING.
MECHANISM FOR INDICATING DISTANCE TRAVELED BY CARS OR VEHICLES.
No. 606,258. Patented June 28, 1898.
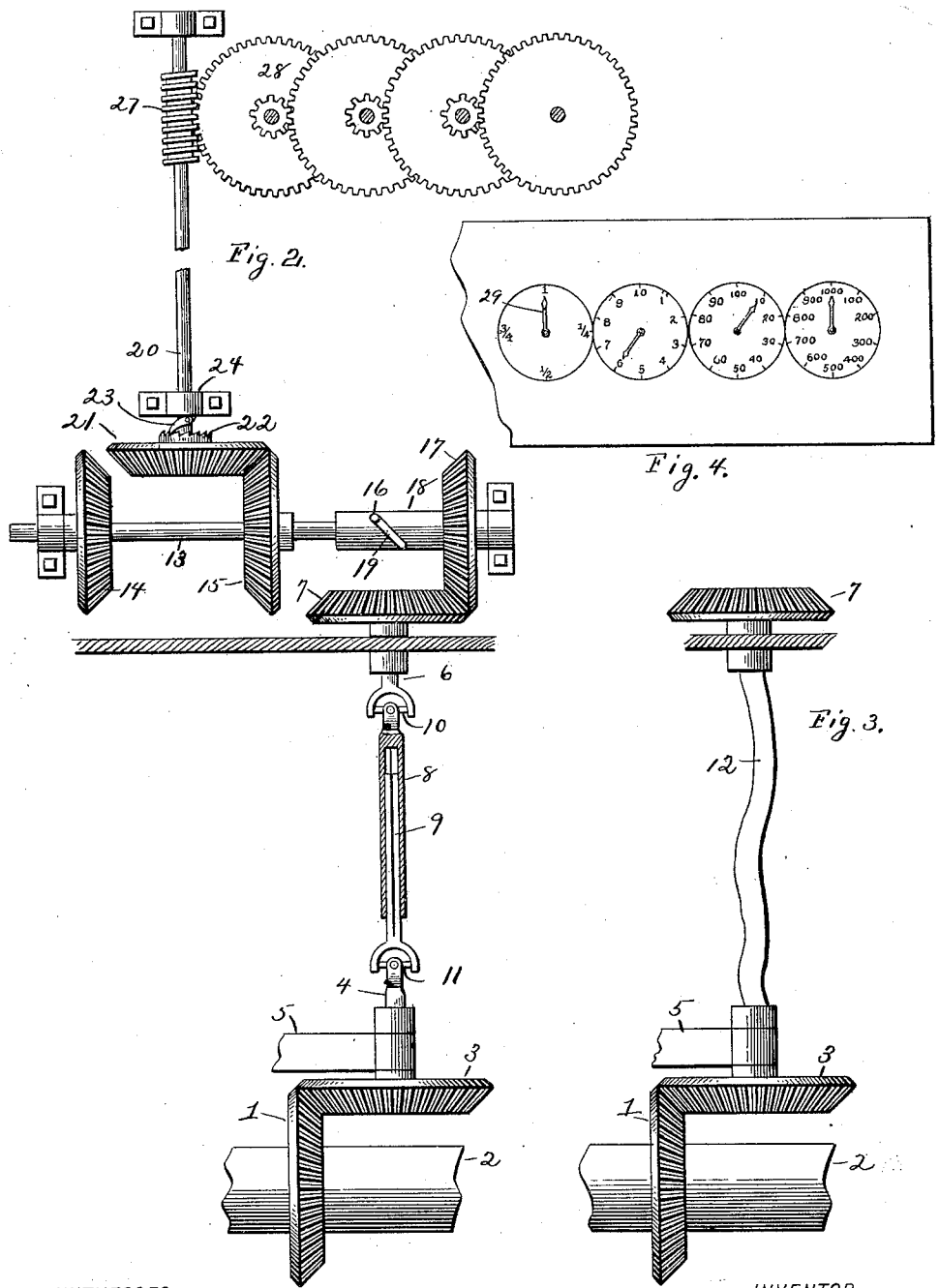
WITNESSES:
Harry D. Pierce
Willis J. Brown
INVENTOR
John H. Whiting
BY
Glascock & Co
ATTORNEYS.

UNITED STATES PATENT OFFICE.

JOHN H. WHITING, OF BELVIDERE, ILLINOIS.

MECHANISM FOR INDICATING DISTANCE TRAVELED BY CARS OR VEHICLES.

SPECIFICATION forming part of Letters Patent No. 606,258, dated June 28, 1898.

Application filed March 13, 1897. Serial No. 627,388. (No model.)

*To all whom it may concern:*

Be it known that I, JOHN H. WHITING, a citizen of the United States, residing at Belvidere, in the county of Boone and State of Illinois, have invented a certain new, useful, and valuable Improvement in Mechanism for Indicating the Distance Traveled by Cars or Vehicles, of which the following is a full, clear, and exact description.

My invention has relation to instruments adapted to indicate the distance traveled by cars or vehicles; and it consists in the novel construction and arrangement of its parts, as hereinafter described.

In the accompanying drawings, Figure 1 is a transverse sectional view of a railway-car, showing my invention located therein. Fig. 2 is an elevation of one form of the device, partly in section; Fig. 3, of an elevation of the modified form of a means for transferring motion from the car-axle to the indicator. Fig. 4 represents the dials and the hands for indicating the number of miles traveled.

The object of my invention is to provide a device that will show at a glance the number of miles traveled by a car or vehicle, the device being adapted to indicate the mileage traveled irrespective of the direction in which the vehicle is going.

A further object of the invention is to provide such a device with a mechanism which will compensate for the varying distance between the axle and the body of the vehicle.

A further object of the invention is to provide a device which is simple and cheap in construction and as compact as possible.

The beveled cog-wheel 1 is permanently fixed on the axle 2. The beveled cog-wheel 3 is fixed to the shaft 4. Said shaft in its turn is journaled in the arm 5. Said arm is secured to the car-truck or other perpendicular stationary point. Thus the distance between said arm 5 and the axle 2 never varies, but remains constant. The cog-wheel 3 meshes with the cog-wheel 1, and shaft 6 is journaled in the floor of the car, and to the upper end of the said shaft is fixed a beveled cog-wheel 7. The sleeve 8 is connected by a universal joint with the lower end of the shaft 6. The arm 9 is connected, by means of a universal joint, with the upper end of the shaft 4. The arm 9 is secured and adapted to slide perpendicularly within the sleeve 8. The universal joints 10 and 11 may be of any desired form, provided said joints will transmit a revolving motion. In Figs. 1 and 2 the said joints are shown as cruciform pintles, to the ends of which the bifurcated ends of the shafts, sleeve, and arm 9 are pivoted. Thus it will be seen that as the axle revolves a revolving motion is transmitted through the shafts 4 and 6 and the sleeve 8 and the arm 9 to the beveled cog-wheel 7, the sleeve 8 and the arm 9 compensating for the perpendicular motion of the body of the car.

When the car is going around curves, the trucks are not in the same line as the body of the car, and hence the universal joints 10 and 11 compensate for this difference in alinement between the trucks and the body of the car, and at the same time the revolving motion is transmitted to the wheel 7.

In Fig. 3 the universal joints 10 and 11, the sleeve 8, and the arm 9 are dispensed with, and in lieu thereof the flexible shaft 12 is provided. Said shaft compensates for the perpendicular motion of the body of the car and also for the difference in alinement between the body of the car and the truck when the car is going around a curve.

A horizontal shaft 13 is journaled to any suitable point within the car, said shaft being provided with the fixed beveled cog-wheels 14 and 15, the beveled faces of said wheels being opposite to each other, as shown in Fig. 2. The shaft is also provided with a pin 16. The beveled cog-wheel 17 is fixed to the collar 18 and said cog-wheel 17 meshes with the cog-wheel 7. The collar 18 is provided with a spiral slot 19, which receives the pin 16, located on the shaft 13. The shaft 20 is perpendicularly journaled. Said shaft has fixed to its lower end the beveled cog-wheel 21. On the upper surface of said cog-wheel 21 the ratchet 22 is located. The pawl 23 is pivoted to the bearing 24. Said pawl 23 engages the ratchet 22 and permits the wheel 21 to revolve in one direction only.

The lower end of the shaft 20 and its attachments, the horizontal shaft 13 and its attachments, and the upper end of the shaft 6 and its attachments are boxed in near the floor of the car, as indicated at 25 in Fig. 1.

The upper end of the shaft 20 is provided with a worm 27, that meshes with the worm-wheel 28, and, as illustrated in Fig. 2, the revolving motion of the shaft 12 is transmitted to the indicating-arms 29, said arms being attached to the shafts of the chain of gear-wheels located within the indicator. The indicator is provided with a number of dials, one showing the fraction of the mile, another showing the miles, another showing the tens of miles, and another showing the hundreds of miles. Other dials may be provided, if necessary.

The device operates as follows: When the car is going in one direction, the revolving motion of the wheel 7 is transmitted to the wheel 17, and the collar 18, engaging the pin 16, causes the shaft 13 to revolve, and, as shown in Fig. 2, the wheel 15 is engaged with the wheel 21. Thus the revolving motion is transmitted to the shaft 20, and through the worm 27 the motion is transmitted to the chain of gears at 28 and from thence to the indicator-arms. Should the vehicle go in the opposite direction, a reverse motion will be given the wheel 7, and the pawl and ratchet prevent the wheel 21 from having any reverse motion. The spiral slot 19, receiving the pin 16, will cause the shaft 13 to move longitudinally in its bearings, and this will bring the wheel 14 in an engagement with the wheel 21 and at the same time the wheel 15 will disengage from the wheel 21, and thus the proper revolving motion will be transmitted to the wheel 21 and the shaft 20.

Having described my invention, what I claim as new, and desire to secure by Letters Patent, is—

A device for indicating the distance traveled by cars or vehicles, consisting of a set of dials located on the vehicle, arms revolving from said dials, a revolving axle, a perpendicular shaft carrying at its lower end a pinion, a pinion mounted on the axle, said pinions engaging each other, an arm connected by a universal joint with said perpendicular shaft, a sleeve receiving the upper end of said arm, said arm adapted to slide longitudinally within said sleeve, a shaft passing through the floor of the car and connected by means of the universal joint with said sleeve, a pinion fixed to the upper end of said shaft, a horizontal shaft journaled within the vehicle, said shaft being adapted to shift longitudinally, a collar located on said shaft, a pinion fixed to said collar, said collar having a spiral slot, a pin located on the horizontal shaft and entering said slot, a perpendicular shaft adapted to transmit motion from the horizontal shaft to the dial-arms, a beveled pinion located at the lower end of the last-said shaft, ratchets located on the upper side of the said beveled pinion, a pawl adapted to engage said ratchets and prevent reverse revolution of the last-said perpendicular shaft, beveled pinions located on the horizontal shaft on opposite sides of the pinion of the last-said perpendicular shaft, but one of the horizontal pinions adapted to engage the pinion of the perpendicular shaft at one time.

In testimony whereof I affix my signature in presence of two witnesses.

JOHN H. WHITING.

Witnesses:
HARRY D. PIERCE,
WILLIS S. BROWN.